Dec. 3, 1957  R. S. STRIMEL  2,814,883
EXTENSOMETER
Filed June 16, 1954
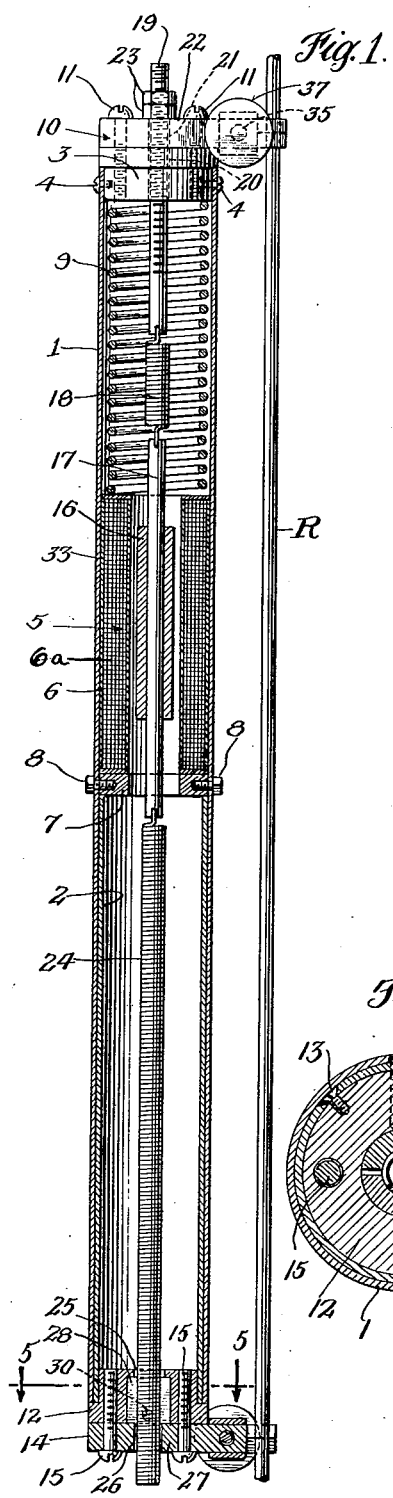
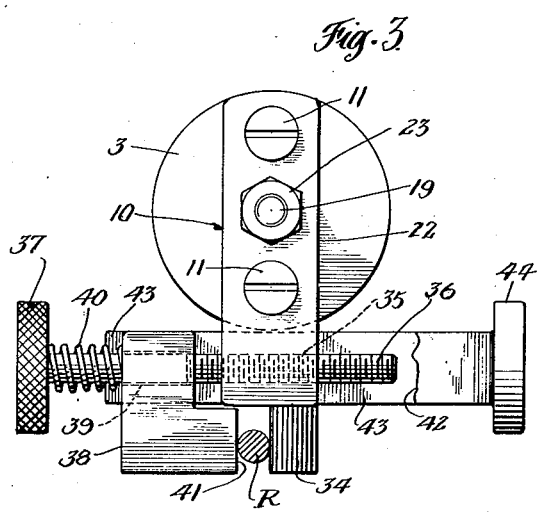
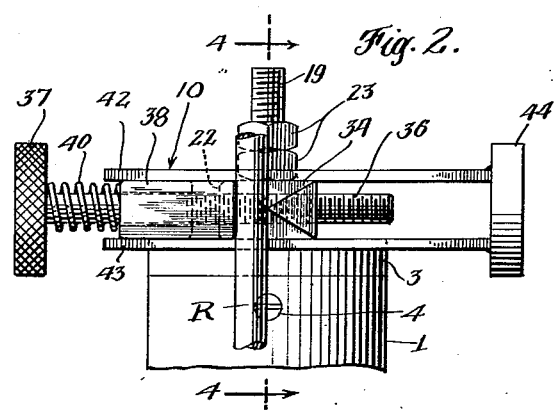
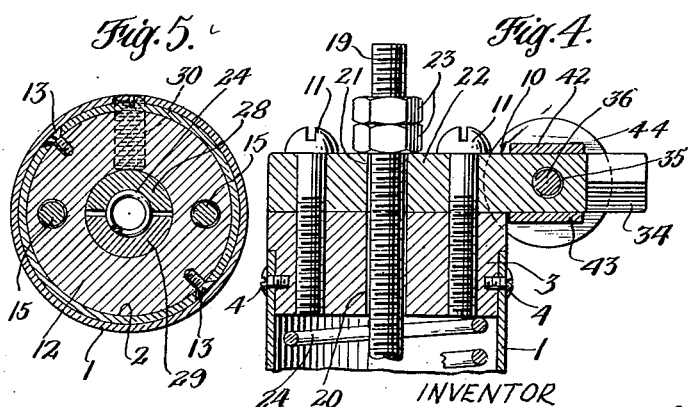
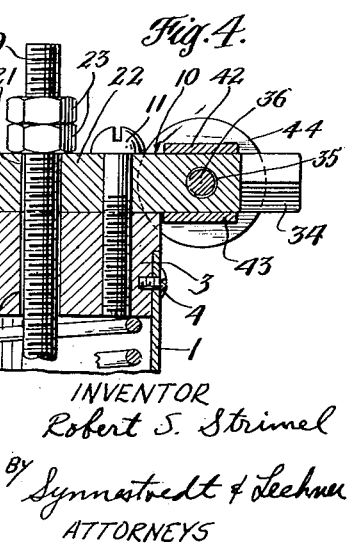
INVENTOR
Robert S. Strimel
BY Synnestvedt & Lechner
ATTORNEYS

United States Patent Office 2,814,883
Patented Dec. 3, 1957

2,814,883

EXTENSOMETER

Robert S. Strimel, Conshohocken, Pa., assignor to Tinius Olsen Testing Machine Company, Willow Grove, Pa., a corporation of Pennsylvania Application June 16, 1954, Serial No. 437,027

5 Claims. (Cl. 33—147)

This invention relates to materials testing equipment, and in particular, relates to an extensometer or an instrument for detecting or sensing strain in a specimen being tested in tension.

The extensometer of the invention is particularly suitable in detecting strain in a specimen such as small-diametered rods or wires or cables. The instrument generates an electrical signal which is proportional to the strain of a specimen under test and thus, is particularly suitable for use with stress-strain recorders such as disclosed in my copending applications, Serial No. 261,239, filed December 21, 1951, and entitled Recording Device for Use in Conjunction With Testing Machines, and Serial No. 346,721, filed April 3, 1953, now Patent 2,784,048, and entitled Recording Unit.

The invention contemplates a main tube having a smaller auxiliary tube slidably mounted therein, the tubes being adapted to be moved relative to one another in telescoping fashion. On one end of each tube is mounted an adapter carrying a unique clamp arrangement which is used to secure the extensometer to a test specimen. The clamps are adjustable to accommodate different-diametered specimens and provide a quick connect and disconnect feature.

Fixed to the inside of the main tube is the housing of a transformer, preferably a differential transformer, carrying the coil or coils thereof. The core of the transformer is mounted to be movable with respect to the transformer coil, the mounting means taking the form of a differential spring arrangement. One spring connects one end of the core to the adapter-clamp on the main tube and a second spring connects the other end of the core and the adapter-clamp on the auxiliary tube.

When the instrument is clamped to a specimen which is being tested in tension, the strain of the specimen causes the clamps to be displaced. The differential spring arrangement interconnecting the transformer core with the clamps causes predetermined movement thereof. Since the transformer coil is fixed with respect to one clamp, there is relative motion between the coil and the core and a signal is generated in accordance with strain.

The manner in which the instrument is constructed and certain important features and advantages thereof will be apparent from the following description and drawings wherein:

Figure 1 is an elevation view partially in section showing the instrument attached to a rod to be tested in tension;

Figure 2 is an enlarged elevational view looking toward the left in Figure 1 illustrating the upper clamp arrangement of Figure 1;

Figure 3 is a plan view of Figure 2;

Figure 4 is a vertical section taken along the lines 4—4 of Figure 2; and

Figure 5 is a plan section taken along the lines 5—5 of Figure 1.

In Figure 1 the numeral 1 indicates a main tube and the numeral 2 indicates an auxiliary tube nested therewithin. The tubes are adapted to be displaced relative to one another in telescoping fashion, as will be explained hereinafter. At one end of the main tube 1 is mounted an adapter 3, which is secured to the tube by the cap screws 4—4. A transformer 5 (preferably a differential transformer) is mounted within the main tube; the housing 6 of the transformer, which carries the coils 6a thereof, rests on a support 7, which is fixed to the main tube by the cap screws 8—8. The housing 6 is held in fixed position by spring 9, which coacts between the adapter 3 and the top of the housing. Fixed to the adapter 3 is a clamp mechanism generally indicated by the numeral 10. The bolts 11—11 secure the clamp to the adapter.

It will be apparent that the transformer may be fixed in the tube 1 by other means. However, I have found the described means to be particularly satisfactory from the standpoint of easy assembly.

At one end of the auxiliary tube 2 is mounted an adapter 12, which is secured to the tube by screws 13—13, as shown in Figure 5. The screws are flush with the surface of the tube so as to permit relative motion of the auxiliary and main tubes. A clamp arrangement generally indicated by the numeral 14 is secured to the adapter by bolts 15—15.

The core of the transformer 5 is indicated by the numeral 16, the core being fixedly secured to a rod 17. The top end of the rod 17 is secured to a tension spring 18 which, in turn, is secured to a threaded rod 19, which extends through aperture 20 in the adapter 3 and aperture 21 in the arm 22 of the clamp 10. The threaded rod 19 carries securing and adjusting nuts 23.

The other end of the rod 17 is connected to a spring 24, which extends through an aperture 25 in the adapter 12 and an aperture 26 in the arm 27 of the clamp 14. The spring 24 is held in the adapter 12 by means of the clamp pieces 28 and 29. These clamp pieces are arranged in the enlargement of the aperture 25 and are of such size that piece 28 may be pushed toward piece 29 by action of the set screw 30 and thus hold the spring in a fixed position.

The threaded rod 19 and nuts 23, together with clamp pieces 28 and 29, provide not only a means of securing the core 16 with respect to the coils of the housing 6 but also provide for adjustability of core position and for adjusting the tensions on springs 18 and 24.

As will be seen in Figure 1, the clamps 10 and 14 secure the instrument to a rod R which is to be tested in tension by a testing machine such as shown in my copending application, Serial No. 230,877, filed June 11, 1951, now Patent No. 2,808,721, and entitled Registering System for Use in Conjunction With Testing Machines. The extension or strain of the rod causes the clamps to move away from one another, which effects displacement of springs 18 and 24, hence, causing displacement of the transformer core 16. At the same time the tubes 1 and 2 are caused to move relative to one another. Since the transformer coil 6a is fixed on the tube 1, hence, fixed with respect to clamp 10, relative motion will be caused between the core and coil. This causes a signal to be generated in accordance with the strain of the specimen.

The springs 18 and 24 have a predetermined stiffness ratio such that they have uniform extension. For example, if spring 24 moves 0.10", then spring 18 will move 0.01". The springs are selected so that the stiffness or displacement ratio remains constant within the intended operating range of the instrument.

The use of the differential springs to impart motion to the transformer core is of particular advantage because it permits very small movement of the core even with rather large displacements of the clamps. For example, in testing certain types of rods the clamps may be displaced 1"

apart, while the total movement of the core in such an instance would be only .150". Thus, the instrument is adaptable for testing specimens over a very wide range of strain. Further, the arrangement permits the use of a transformer of relatively small axial length which is desirable from the standpoint of good linearity of response.

It will be apparent that the arrangement of the nested tubes not only provides a rugged housing for the transformer and springs but, in addition, is particularly suitable as support or guide means, i. e., to insure that the springs and transformer core move along the same axial path.

The signal from the transformer may be taken off by any convenient means, for example, by means of a terminal block secured to the tube 1, say, at a position indicated by numeral 33 or by running the leads up through the tube 1 and out through the adapter 3 to a terminal block located thereon. The leads for conducting power to the transformer may be similarly arranged.

In connection with the transformer, it should be pointed out that although the arrangement of having the coil fixed and the core movable with respect to a clamp is preferred, these elements may be reversed in position, that is to say, the core may be fixed and the coil movable with respect to a clamp.

The clamps for attaching the instrument to a test specimen will next be described. The clamps are identical in construction and, therefore, the detailed description will be only with respect to clamp 10.

As mentioned heretofore, the clamp 10 includes an arm 22 which extends outwardly beyond the body of the instrument as seen in Figures 1 and 3 and carries a knife edge portion 34. The arm has a threaded hole 35, carrying a bolt 36 which extends outwardly to the left and carries a knurled head 37 at the end thereof. Slidably mounted on the bolt is a right-angled slider 38. The aperture 39 in the slider 38 provides for the sliding motion. A spring 40 is disposed between the head 37 and the slider 39 and tends to urge the slider to the right as viewed in Figure 3. The slider has an abutment surface 41, which is adapted to engage a test specimen such as rod R and push the same into tight engagement with the knife edge 34. The slider 38 has guides 42 and 43 brazed thereto, which extend over the arm 22 to the right as viewed in Figure 2 and carry a button 44.

The clamp is operated by placing the thumb on the knurled nut 37 and the forefinger on the button 44 and squeezing the nut and button together. This causes the slider 38 to move to the left and open up the space between the knife edge and the abutment surface 41. Thus, the instrument may be quickly engaged or disengaged from a test specimen. As will be apparent, the nut 37 may be manipulated so as to widen or shorten the gap between the surface 41 and the knife edge 34 so as to accommodate different-sized specimens.

I claim:

1. In an extensometer: a coil element and a core element relatively movable with respect to one another; and differential spring means to effect said movement including two springs one end of each being respectively connected to the opposite ends of one of said elements, the other end of one of the springs being fixedly connected to the other of said elements and the other end of the other of said springs being movable with respect to said other element.

2. An extensometer comprising: a first tube; a differential transformer including a coil and a core, the coil being fixed in said first tube; a first spring interconnecting said core with one end of said tube; a second tube slidably mounted on said first tube; a second spring interconnecting said core with said second tube, the second spring having a stiffness ratio different from that of the first spring; and an adjustable clamp on each tube, the clamps being adapted to hold the extensometer on a specimen to be tested.

3. In an extensometer: a first support; a coil element and a core element, one of said elements being fixed to said support; first resilient means interconnecting the other of said elements with said support; a second support slidably mounted on said first support; and second resilient means interconnecting said other element with said second support, the second resilient means having a stiffness ratio different from that of the first resilient means.

4. An extensometer comprising: a first and a second clamp spaced apart from one another, each clamp being adapted for connection to a specimen to be tested in tension whereby at least one of the clamps is movable therewith; a first spring connected with one of said clamps; a second spring having a stiffness ratio different from that of the first spring connected with the other of said clamps; a coil element and a core element, one of said elements being connected with said springs and the other of said elements being connected to one of said clamps; and means connected between the clamps and providing for movement of the clamps along a common axis when said specimen is tested in tension.

5. In an extensometer: a coil element and a core element adapted to be movable relative to one another; clamping means for securing said elements to a test specimen and adapted to be movable relative to one another; and mechanism interconnecting said elements and said clamping means including two springs of different stiffness ratio whereby to provide for the relative movement of said coil and core elements to be less than the relative movement of said clamping means.

References Cited in the file of this patent
UNITED STATES PATENTS

| | | |
|---|---|---|
| 2,122,664 | Terry | July 5, 1938 |
| 2,365,592 | Reason | Dec. 19, 1944 |
| 2,376,038 | Dawson | May 15, 1945 |
| 2,474,802 | Poole | June 28, 1949 |
| 2,578,066 | Hyde | Dec. 11, 1951 |